3,032,525
PLASTICIZED COMPOSITIONS OF A HALO-VINYL-
IDENE RESIN AND A BORAZOLE
Stanley F. Stafiej, Stamford, Conn., and Stephen J.
Groszos, Naperville, Ill., assignors to American Cyanamid Company, New York, N.Y., a corporation of Maine
No Drawing. Original application Mar. 25, 1957, Ser. No. 647,937. Divided and this application Mar. 30, 1960, Ser. No. 18,490
8 Claims. (Cl. 260—32.4)

This invention relates to new compositions and more particularly to new compositions comprising (1) a polyvinylidene halide resin, and specifically a polyvinyl halide resin, and (2) a compound containing boron and nitrogen. Still more particularly, the invention is concerned with such compositions containing a substituted borazole.

A review of borazoles by E. Wiberg appears in Naturwissenschaften, 35, 182, 212 (1948).

The borazoles used in practicing this invention may be represented graphically by the following general formula:

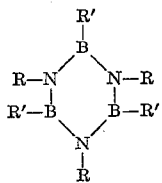

where R represents an aryl radical, which can be the same or different, and R' represents an alkyl (including cycloalkyl) radical containing at least 2 carbon atoms. The alkyl radicals represented by R' can be the same or different, and may contain up to, for example, 26 carbon atoms but preferably contain not more than 18 carbon atoms. The preferred lower limit depends upon the particular use of the compound. Thus, where it is desired that the substituted borazole have improved oil-solubility properties R' advantageously is an alkyl radical containing a minimum of 3, preferably 4 or more carbon atoms.

Illustrative examples of aryl radicals represented by R in the above formula are: phenyl, biphenylyl or xenyl, naphthyl, etc. Illustrative examples of alkyl radicals represented by R' are ethyl, propyl, isopropyl, n-butyl, isobutyl, sec.-butyl, tert.-butyl, amyl, isoamyl, hexyl to hexaeicosyl, inclusive (both normal and isomeric forms), cyclopentyl, cyclohexyl, cycloheptyl, etc.

The boron compounds, more particularly substituted borazoles, used in practicing this invention range from liquids to semi-solids and solids in normal state. They are useful, for instance, as components of flame-resisting compositions; as plasticizers; as fuel additives; as scintillation counters; as the active ingredient in insecticides, bactericides, germicides, fungicides, pesticides and the like; as a chemical intermediate for use in the preparation of other compounds; as a component of arc-extinguishing tubes, and especially of surfaces that are exposed to the action of the arc. Other uses include: as rocket fuels or as components of such fuels; as polymer additives to impart neutron-absorbing properties to the polymer to which it is added and to improve the thermal stability of the polymer; as heat-exchange media or as modifiers of such media whereby they can be used at higher temperatures; as petroleum additives which are hydrolytically stable (e.g., viscosity-index improvers, lubricants and greases for high-temperature applications, cetane improvers, ignition promoters, anti-knock agents, preventives of pre-ignition, etc.); and in making new types of dyes and pigments.

In any of the aforementioned and other applications or uses, one can employ a single compound of the kind embraced by Formula I or a plurality of such compounds in any proportions. They can be used in conjunction with any of the conventional components of flame-resisting compositions, plasticizers, insecticides, bactericides, germicides, fungicides, pesticides, and other compositions hereinbefore mentioned by way of illustrating the fields of utility, generically and specifically, of the substituted borazoles of this invention.

The compounds used in practicing this invention can be prepared by various methods, including those which are broadly and specifically disclosed and claimed in application Serial No. 647,934, filed March 25, 1957, now Patent No. 2,892,869, dated June 30, 1959, and in our copending application Serial No. 647,935, also filed March 25, 1957, that is, concurrently with application Serial No. 647,937, of which the present application is a division. Applications Serial Nos. 647,935 and 647,937 have now been abandoned.

In order that those skilled in the art may better understand how the present invention can be carried into effect, the following examples are given by way of illustration and not by way of limitation.

EXAMPLE 1

Preparation of B-Triethyl-N-Triphenylborazole

Ethyl magnesium bromide, prepared from magnesium (3.54 g.; 0.140 g. atom), and ethyl bromide (15.9 g.; 0.146 mole), in anhydrous diethyl ether is added dropwise over a 30-minute period to a suspension of B-trichloro-N-triphenylborazole (13.0 g.; 0.0316 mole) in 100 ml. dry diethyl ether at 0°–30° C. After refluxing for 2 hours, the cooled reaction mass is titrated with a saturated, aqueous solution of ammonium chloride solution to the point at which the magnesium salts separate from the clear, colorless ether layer. The dry ether solution is concentrated to a volume of ca. 75 ml. and methyl alcohol is slowly added to the boiling ether solution until the B-triethyl-N-triphenylborazole begins to crystallize from solution. In this manner, 8.38 g. of product is obtained. Yield: 68% of the theoretical.

Recrystallization from a solvent mixture of diethyl ether and methanol yields a purer product; M.P. 168°–170° C.

| Analysis | C | H | N | B |
|---|---|---|---|---|
| Calculated for $C_{24}H_{30}N_3B_3$, Percent | 73.35 | 7.70 | 10.69 | 8.26 |
| Found, Percent | 73.10 | 7.74 | 10.84 | 8.26 |

Instead of using ethyl magnesium bromide as the Grignard reagent as described above, one can use an equivalent amount of ethyl magnesium chloride. Also, instead of employing B-trichloro-N-triphenylborazole as the halogenoborazole reactant as described above, one can use an equivalent amount of B-tribromo-N-triphenylborazole.

EXAMPLE 2

Preparation of B-Tri-n-Propyl-N-Triphenylborazole

B-tri-n-propyl-N-triphenylborazole is prepared by reaction between 0.144 mole of n-propyl magnesium bromide and 0.024 mole of B-trichloro-N-triphenylborazole following the same general procedure described under Example 1. An 84% yield of the desired product, M.P. 168°–171° C., is obtained. The analytical sample, recrystallized from a solvent mixture of diethyl ether and methanol, has a melting point of 169°–171° C.

| Analysis | C | H | N | B |
|---|---|---|---|---|
| Calculated for $C_{27}H_{36}N_3B_3$, Percent | 74.54 | 8.34 | 9.66 | 7.46 |
| Found, Percent | 74.25 | 8.17 | 10.09 | 7.19 |

EXAMPLE 3

*Preparation of B-Tri-n-Butyl-N-Triphenylborazole*

The n-butyl Grignard reagent is prepared from 1.48 g. (0.061 mole) of magnesium and 8.32 g. (0.061 mole) of n-butyl bromide in 200 ml. of anhydrous diethyl ether. Finely pulverized solid B-trichloro-N-triphenylborazole (5.0 g.; 0.012 mole) is added in small portions to the Grignard solution at about 20° C. over a 90-minute period. The solution becomes cloudy with a considerable amount of material remaining insoluble in the reaction mixture, even after refluxing for 24 hours. After treating the reaction mass, cooled in an icewater bath, with a 5% aqueous HCl solution to decompose any unreacted Grignard reagent and/or any Grignard complex therein, the whole is transferred to a separatory funnel. A small amount of material (ca. 2 g.), which remains insoluble in both layers, is removed by filtration and, during the course of air-drying, it decomposes. Since the odor of aniline is detected, this material is probably the starting material. The desired product under these conditions appears to be stable. The ether layer is washed with water, dried over $Na_2SO_4$ and evaporated to a viscous liquid which partially crystallizes on trituration with petroleum ether. Recrystallization of this material from anhydrous diethyl ether yields only amorphous material containing boron, which material does not melt below 320° C. The mother liquor on standing for several weeks deposits crystalline material, M.P. 132°–135° C. Recrystallization from a mixture of diethyl ether and methanol yields about 7% (of the theoretical) of the desired compound, B-tri-n-butylborazole, M.P. 129°–132° C. A sample, further recrystallized for analysis from the same solvent mixture, has the same melting point (129°–132° C.).

| Analysis | C | H | N | B |
|---|---|---|---|---|
| Calculated for $C_{30}H_{42}N_3B_3$, Percent | 75.51 | 8.87 | 8.81 | 6.80 |
| Found, Percent | 75.39 | 8.67 | 8.78 | 6.43 |

The same compound, B-tri-n-butyl-N-triphenylborazole, is obtained in a yield of about 70% of the theoretical following the general procedure described under Example 1 and using 0.146 mole of n-butyl magnesium bromide and 0.0342 mole of B-trichloro-N-triphenylborazole.

This example provides an illustration of the material increase in yield of desired product that is obtained when following the preferred procedure of admixing the reactants, that is, adding the Grignard reagent to the halogenoborazole, and refluxing thereafter. Also, by using a shorter reaction period the substituted borazole formed during the reaction is subjected to a lower temperature than when the halogenoborazole is added to the Grignard reagent, and the admixture is then refluxed until the reaction has been completed.

EXAMPLE 4

*Preparation of B-Tri-n-Dodecyl-N-Triphenylborazole*

The subject compound is obtained as a nicely crystalline solid by reaction between 0.146 mole of n-dodecyl magnesium bromide and 0.0364 mole of B-trichloro-N-triphenylborazole, following essentially the same procedure described under Example 1 with reference to the preparation of B-triethyl-N-triphenylborazole.

EXAMPLE 5

*Preparation of B-Tri-Isopropyl-N-Triphenylborazole*

Isopropyl magnesium bromide is prepared in diethyl ether from magnesium (3.5 g.; 0.144 g. atom) and isopropyl bromide (17.7 g.; 0.144 mole) and added dropwise over a one-hour period to a suspension of B-trichloro-N-triphenylborazole (10 g.; 0.024 mole) in dry di-n-butyl ether (100 ml.) at about 20°–30° C. During the addition of the Grignard reagent, a gray solid separates from solution. After the addition has been completed, most of the diethyl ether is removed and replaced by di-n-butyl ether, and the reaction mass is then heated on a steam bath for 15 hours. After the di-n-butyl ether has been removed under vacuum and replaced by diethyl ether, a saturated, aqueous solution of ammonium chloride is added until the magnesium salts separate from a clear ether solution. The product comprising B-tri-isopropyl-N-triphenylborazole is isolated by evaporation of the dry ether solution and is then recrystallized from a diethyl ether-methyl alcohol mixture to yield 2.01 g.; M.P. 192°–194°. Yield: 19% of the theoretical. The analytical sample, M.P. 197°–198°, is obtained upon a second recrystallization from ether-methyl alcohol.

| Analysis | C | H | N | B |
|---|---|---|---|---|
| Calculated for $C_{27}H_{36}N_3B_3$, Percent | 74.54 | 8.34 | 9.66 | 7.46 |
| Found, Percent | 74.83 | 8.46 | 10.08 | 7.19 |

EXAMPLE 6

*Preparation of B-Tri-Isobutyl-N-Triphenylborazole*

The subject compound, M.P. 184°–186° C., is obtained in 67% yield by reaction between 0.144 mole of isobutyl magnesium bromide and 0.024 mole of B-trichloro-N-triphenylborazole, following essentially the same procedure described under Example 5 with reference to the preparation of B-tri-isopropyl-N-triphenylborazole.

| Analysis | C | H | N | B |
|---|---|---|---|---|
| Calculated for $C_{30}H_{42}N_3B_3$, Percent | 75.51 | 8.87 | 8.81 | 6.80 |
| Found, Percent | 75.21 | 8.86 | 8.78 | 7.13 |

EXAMPLE 7

*Preparation of B-Tri-(Cyclohexyl)-N-Triphenylborazole*

The subject compound is prepared from 0.144 mole of cyclohexyl magnesium bromide and 0.024 mole of B-trichloro-N-triphenylborazole, following essentially the same procure described under Example 1 with reference to the preparation of B-triethyl-N-triphenylborazole.

The following example illustrates one of the many uses of the substituted borazoles herein involved, namely, as a component of a moldable (molding) composition.

EXAMPLE 8

| | Parts |
|---|---|
| Polyvinyl chloride (gamma polyvinyl chloride) | 100 |
| B-tri-n-butyl-N-triphenylborazole | 50 | are mixed together on a standard rubber mill at about 130° C. until a sheet, 40 to 50 mils thick, is obtained. The resulting sheet is flexible, tough, somewhat elastic and has excellent tensile strength. It is suitable for uses where polyvinyl chloride compositions are now employed.

One can replace part of the substituted borazole in the above formulation, for instance up to 90% by weight thereof (45 parts), with other plasticizers for polyvinyl chloride, e.g., a saturated aliphatic hydrocarbon triester of cyanuric acid, especially a trialkyl cyanurate and more particularly one containing not less than 4 and not more than 6 carbon atoms in each alkyl radical. The cyanuric triester not only functions as a plasticizer for polyvinyl chloride but also renders the plasticized composition resistant to discoloration under the action of heat.

The substituted borazoles employed in practicing this invention can be used in plasticized polyvinyl halide (chloride, bromide, etc.) and polyvinylidene halide (chloride, bromide, etc.) compositions, alone or with other plasticizers or modifiers, in amounts corresponding to from 2% to 65% by weight of the plasticized composition.

We claim:
1. A composition comprising (1) a resin selected from the class consisting of polyvinyl halides and polyvinylidene halides and (2) a compound represented by the general formula

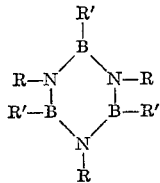

where R represents an aryl radical selected from the class consisting of phenyl, biphenylyl and naphthyl radicals, and R′ represents an alkyl radical containing from 3 to 26 carbon atoms, inclusive, the compound of (2) constituting from 2% to 65% by weight of the aforesaid composition.

2. A composition as in claim 1 wherein the polyvinyl halide resin of (1) is polyvinyl chloride resin.

3. A composition as in claim 1 wherein the compound of (2) is B-tri-n-butyl-N-triphenylborazole.

4. A plasticized composition comprising (1) polyvinyl chloride resin and (2) a plasticizer for said polyvinyl chloride resin comprising B-tri-n-butyl-N-triphenylborazole, the plasticizer of (2) constituting from 2% to 65% by weight of the plasticized composition.

5. A plasticized composition as in claim 4 wherein up to 90% by weight of the B-tri-n-butyl-N-triphenyl-borazole has been replaced by a saturated aliphatic hydrocarbon triester of cyanuric acid.

6. A plasticized composition as in claim 5 wherein the saturated aliphatic hydrocarbon triester of cyanuric acid is a trialkyl cyanurate.

7. A plasticized composition as in claim 6 wherein the trialkyl cyanurate is one containing not less than 4 and not more than 6 carbon atoms in each alkyl radical.

8. A composition comprising (1) a polyvinylidene halide resin and (2) a compound represented by the general formula

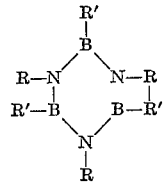

where R represents an aryl radical selected from the class consisting of phenyl, biphenylyl and naphthyl radicals, and R′ represents an alkyl radical containing from 3 to 26 carbon atoms, inclusive, the compound of (2) constituting from 2% to 65% by weight of the aforesaid composition.

References Cited in the file of this patent
UNITED STATES PATENTS
2,892,869    Groszos et al. _____ June 30, 1959

UNITED STATES PATENT OFFICE
CERTIFICATE OF CORRECTION

Patent No. 3,032,525 — May 1, 1962

Stanley F. Stafiej et al.

It is hereby certified that error appears in the above numbered patent requiring correction and that the said Letters Patent should read as corrected below.

Column 6, lines 12 to 19, the formula should appear as shown below instead of as in the patent:

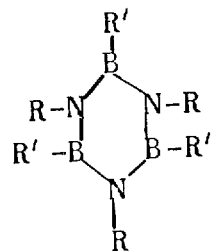

Signed and sealed this 21st day of August 1962.

(SEAL)
Attest:

ESTON G. JOHNSON
Attesting Officer

DAVID L. LADD
Commissioner of Patents